United States Patent [19]

Iwabuchi et al.

[11] Patent Number: 4,657,996
[45] Date of Patent: Apr. 14, 1987

[54] PROCESS FOR PRODUCING POLYETHYLENE

[75] Inventors: Takeshi Iwabuchi; Masao Kawahara; Sakae Kamiyama; Terumi Sato, all of Ichihara, Japan

[73] Assignee: Nissan Chemical Industries Ltd., Tokyo, Japan

[21] Appl. No.: 833,670

[22] Filed: Feb. 27, 1986

Related U.S. Application Data

[63] Continuation of Ser. No. 404,925, Aug. 3, 1982, abandoned.

[30] Foreign Application Priority Data

Jul. 13, 1982 [JP] Japan ................... 57-121759

[51] Int. Cl.$^4$ ............................ C08F 4/02; C08F 10/02
[52] U.S. Cl. ..................................... 526/127; 502/110; 502/120; 502/125; 526/128; 526/348.2; 526/348.6; 526/352
[58] Field of Search .................... 526/127, 128

[56] References Cited

U.S. PATENT DOCUMENTS

| | | | |
|---|---|---|---|
| 3,907,759 | 9/1975 | Okada et al. | 526/128 |
| 4,223,118 | 9/1980 | Tsubaki et al. | 526/128 |
| 4,258,167 | 3/1981 | Tsubaki et al. | 526/128 |
| 4,339,560 | 7/1982 | Baba et al. | 526/141 |
| 4,350,802 | 9/1982 | Baba et al. | 526/351 |

FOREIGN PATENT DOCUMENTS

| | | | |
|---|---|---|---|
| 1542820 | 3/1979 | United Kingdom | 526/128 |
| 1554248 | 10/1979 | United Kingdom | 526/128 |

*Primary Examiner*—Edward J. Smith
*Attorney, Agent, or Firm*—Oblon, Fisher, Spivak, McClelland & Maier

[57] ABSTRACT

A process for producing polyethylene comprises polymerizing ethylene or copolymerizing ethylene with other α-olefin in the presence of a catalyst system obtained by bringing the following components (I) to (III) in contact with one another:

(I) a reaction product (B) obtained by reacting an intermediate reaction product (A) obtained by a reaction of a hydropolysiloxane with a Grignard reagent, with at least one nucleophilic reagent selected from an aldehyde, a ketone and an alcohol,
(II) a transition metal compound, and
(III) at least one organic aluminum compound.

14 Claims, No Drawings

PROCESS FOR PRODUCING POLYETHYLENE

This application is a continuation of application Ser. No. 404,925, filed Aug. 3, 1982, now abandoned.

BACKGROUND OF THE INVENTION

1. Field of the Invention

The present invention relates to a process for producing polyethylene by polymerizing ethylene or copolymerizing ethylene with other $\alpha$-olefin in the presence of a highly active catalyst system, the preparation of which is simplified with use of a novel magnesium component.

2. Description of the Prior Art

It has been disclosed that when polymerization of ethylene or copolymerization of ethylene with other $\alpha$-olefin (the polymerization and copolymerization will hereinafter generally be referred to as "polymerization of ethylene") is carried out in the presence of a catalyst system comprising a solid catalyst component obtained by reacting a reaction product of a hydropolysiloxane with a Grignard reagent, with a titanium or vanadium halide or an organoaluminum or a dialkylzinc, the yield of polyethylene per unit weight of the transition metal is extremely high, and the process as such is extremely advantageous for the industrial production of polyethylene (Japanese Examined Patent Publication No. 13232/80).

In the above Patent Publication, it is recommended that in order to remove an ether compound accompanying the Grignard reagent in the preparation of the reaction product of the hydropolysiloxane with the Grignard reagent, the reaction mixture is dried by evaporation and then dissolved in an aromatic hydrocarbon or an aromatic hydrocarbon having a boiling point higher than that of the ether compound is added to the reaction mixture and then the ether compound is removed by distillation to obtain the reaction product in a state as dissolved in the aromatic hydrocarbon. The amount of the ether compound remaining in the reaction product is influencial over the catalytic activity and it is therefore desired to minimize the remaining ether compound. However, according to the above mentioned methods, it is difficult to reduce the amount of the remaining ether compound to less than 0.4 mol per mol of magnesium in the reaction product. Namely, the reaction product of the hydropolysiloxane with the Grignard reagent is insoluble in an aliphatic hydrocarbon or an alicyclic hydrocarbon, and accordingly when such a hydrocarbon having a boiling point higher than the ether compound is added to the reaction mixture and the mixture is subjected to distillation in an attempt to remove the ether compound, the viscosity of the reaction mixture tends to gradually increase and the mixture becomes difficult to stir, or the reaction product tends to separate from the hydrocarbon and adheres to the wall of the distillation vessel, whereby it is impossible to properly carry out the distillation. Thus, it is thereby difficult to obtain the reaction product with a minimum amount of the remaining ether compound, in a form of a suspension.

It is generally known that when ethylene is polymerized in the presence of a Ziegler catalyst, an aliphatic hydrocarbon or an alicyclic hydrocarbon is usually used as the polymerization medium and the catalytic activity will be deteriorated if an aromatic hydrocarbon is incorporated. Therefore, when the aromatic hydrocarbon solution of the above reaction product is to be used as a catalyst component, it is essential to remove the aromatic hydrocarbon prior to supplying it to the polymerization reactor, and it is necessary to sufficiently wash the solid component obtained by the reaction with an excess amount of a transition metal compound, with an aliphatic hydrocarbon or an alicyclic hydrocarbon. Consequently, it is necessary either to incinerate the waste liquor discharged from the washing operation, after removal of the transition metal compound, or to distil it to recover the respective hydrocarbons. An improvement has therefore been desired for simplifying the preparation of the catalyst.

On the other hand, a solution polymerization is known in which the polymerization of ethylene is carried out with use of a Ziegler catalyst at such a high temperature condition that the polymer is formed in a form of a solution. For this solution polymerization method, it is desired that the polymerization is carried out at a temperature as high as possible in order to facilitate the removal of the reaction heat generated during the polymerization or to facilitate the separation of the polymer from the solvent and to maintain the melting temperature of the polymer thereby separated at a high level so that it can be pelletized with a minimum amount of energy, or to lower the viscosity of the polymer solution in the polymerization reactor and thereby to increase the concentration of the polymer solution. However, when ethylene is polymerized with use of the catalyst system proposed in the above mentioned Patent Publication at a polymerization temperature of at least 110° C., especially at least 170° C., at which the polymer forms a solution, there is a drawback that the catalytic activity is thereby considerably decreased. Consequently, the polymer obtained at such a high temperature has a drawback that it contains a substantial amount of the catalyst residue which tends to lead to the formation of rust on the molding machine or the colour degradation of the formed product. Under the circumstances, it has been desired to develop a catalyst system which does not undergo degradation of the catalytic activity even at a high temperature.

SUMMARY OF THE INVENTION

The present inventors have conducted an extensive research to overcome the drawbacks of the conventional processes. As a result, it has been found that the removal of the ether compound can be facilitated by reacting Si—H groups present in the reaction product of a hydropolysiloxane with a Grignard reagent, with a nucleophilic reagent such as an aldehyde, a ketone or an alcohol, even when an aliphatic hydrocarbon or an alicyclic hydrocarbon is used, and if a proper condition is selected, it is possible to obtain the reaction product in such a state as dissolved in the hydrocarbon. It has been confirmed that the preparation of a catalyst system can be simplified by bringing this reaction product in contact with a transition metal compound and an organoaluminum compound, and the catalytic activity will not thereby be decreased even at a high temperature of at least 170° C. Thus, the present invention has been accomplished.

A first object of the present invention is to provide a process for polymerization of ethylene, whereby a high catalytic activity is obtainable even at a high polymerization temperature of at least 170° C. and the catalyst residue in the polymer thereby obtained is minimized so that the step of removing the catalyst residue may be omitted.

A second object of the present invention is to provide a process for polymerization of ethylene, whereby it is not required to wash the solid catalyst component prior to supplying it to the polymerization reactor or to treat the waste liquor and whereby the preparation of the catalyst system is simplified.

A third object of the present invention is to provide a process for polymerization of ethylene, whereby it is possible to obtain a polymer having a narrow molecular weight distribution and high strength and being useful for the production of an injection molded product or a blown film.

The present invention provides a process for producing polyethylene which comprises polymerizing ethylene or copolymerizing ethylene with other α-olefin (hereinafter referred to simply as "polymerization of ethylene") in the presence of a catalyst system obtained by bringing the following components (I), (II) and (III) in contact with one another:

(I) a reaction product (B) obtained by reacting an intermediate reaction product (A) obtained by a reaction of a hydropolysiloxane with a Grignard reagent, with at least one nucleophilic reagent selected from an aldehyde, a ketone and an alcohol, (II) a transition metal compound, and (III) at least one organic aluminum compound.

Another feature of the present invention resides in that with use of the reaction product (B) obtainable under a specific condition and being soluble in an aliphatic hydrocarbon or an alicyclic hydrocarbon, it is possible to supply all of the catalyst components in a liquid form to the polymerization reactor, whereby troubles such as clogging of the piping or the supply pump by the solid components can be eliminated.

DETAILED DESCRIPTION OF THE PREFERRED EMBODIMENTS

The hydropolysiloxane used in the preparation of the intermediate product (A) of the present invention is a silicon-containing chain or cyclic compound having a structural unit represented by the general formula

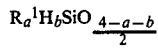

wherein $R^1$ is a $C_1$–$C_{12}$ hydrocarbon group, an alkoxy group or a phenoxy group, a is 0, 1 or 2 and b is 1, 2 or 3 provided $a+b \leq 3$.

The degree of polymerization of the hydropolysiloxane is not critical, and the hydropolysiloxane may be a grease or wax having various degrees of polymerization ranging from a low viscosity liquid having a low polymerization degree to the one having a viscosity of 100,000 centistokes at 25° C. Further, it may be a solid. The terminal groups of the hydropolysiloxane do not substantially affect the catalytic activity and may be optional inert groups such as trialkyl silyl groups. Hydropolysiloxanes which may usually be used in the present invention, include tetramethyl disiloxane, tetraethyl disiloxane, diphenyl disiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane, and chlorophenylhydropolysiloxane.

The Grignard reagent to be used in the present invention is obtainable by a reaction of a halogen-containing organic compound with metal magnesium, and is a compound represented by the general formula $(MgR_2^2)_p \cdot (MgR^2X)_q$ where $R_2$ is a $C_1$–$C_{12}$ hydrocarbon group, X is a halogen atom, and each of p and q is a number of from 0 to 1 provided $p+q=1$, or its ether complex compound or a mixture thereof. For instance, there may be mentioned a so-called Grignard reagent represented by the formula $MgR^2X$ i.e. p is 0 and q is 1, a dihydrocarbyl magnesium represented by the formula $MgR_2^2$, i.e. p is 1 and q is 0, and various other organic magnesium halides represented by the formula $(MgR_2^2)_p \cdot (MgR^2X)_q$ where p and q take various intermediate values, and ether complexes thereof or mixtures thereof.

These Grignard reagents can readily be prepared by a conventional method, for instance, in an ether solvent such as diethyl ether, dibutyl ether or tetrahydrofuran or in a hydrocarbon solvent such as heptane, octane, benzene or toluene in the presence of a proper amount of a complexing agent such as an ether or amine.

As specific examples of the compounds of the formula $MgR^2X$, there may be mentioned methyl magnesium chloride, ethyl magnesium chloride, ethyl magnesium bromide, n-propyl magnesium chloride, n-butyl magnesium chloride, tert-butyl magnesium chloride, n-octyl magnesium chloride and phenyl magnesium chloride.

As specific examples of the compounds of the formula $MgR_2^2$, there may be mentioned diethyl magnesium, di-n-propyl magnesium, di-n-butyl magnesium, di-tert-butyl magnesium, di-n-octyl magnesium, and diphenyl magnesium.

The reaction of the hydropolysiloxane with the Grignard reagent is carried out, for instance, in the following manner.

Namely, the hydropolysiloxane is portion-wise added to the Grignard reagent synthesized in a proper solvent under stirring (or conversely, the Grignard reagent may be added to the hydropolysiloxane). After the addition of the total amount, the mixture is heated and reacted for a predetermined period of time. Alternatively, metal magnesium may be dispersed in a suitable solvent in the same manner as in the preparation of a Grignard reagent, and while stirring, a mixture of the organic halide and hydropolysiloxane is dropwise added at a predetermined temperature, and thereafter the mixture is reacted for a predetermined period of time. This reaction proceeds at room temperature with a vigorous heat generation. To complete the reaction, it is preferred to heat the mixture at a temperature of from 20° to 100° C., especially from 30° to 80° C., for from 1 to 5 hours. A temperature higher than 100° C. is not desirable since the Si—H bonds thereby tend to undergo decomposition. The charging amounts of the hydropolysiloxane and the Grignard reagent are preferably such that the molar ratio of $MgR^2$:Si is 1:1 to 1:20, especially from 1:1 to 1:5.

It is known that when methylhydropolysiloxane is used as the hydropolysiloxane, the reaction to obtain the intermediate reaction product (A) proceeds in the following manner (Japanese Examined Patent Publication No. 13232/80).

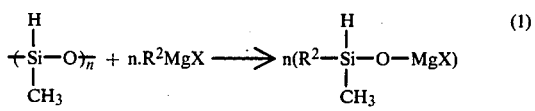

(n is the degree of polymerization or mols.)

The intermediate reaction product (A) is obtainable in a form of a solution when a Grignard reagent synthesized in tetrahydrofuran is used, or in a form of a suspension when a chain ether compound such as diethyl ether is used.

The nucleophilic reagent to be used for the preparation of the reaction product (B) of the present invention is an aldehyde or ketone represented by the general formula $R^3COR^4$ where $R^3$ and $R^4$ may be the same or different and each represents a hydrogen atom or a $C_1$-$C_{17}$ hydrocarbon group and the general formula

where $R^5$ is a divalent $C_3$-$C_{17}$ hydrocarbon group, or an alcohol represented by the general formula $R^6OH$ where $R^6$ is a $C_1$-$C_{18}$ hydrocarbon group.

As specific examples of the aldehyde, there may be mentioned formaldehyde, acetoaldehyde, n-propylaldehyde, n-butyraldehyde, isobutyraldehyde, n-valeraldehyde, trimethylacetoaldehyde, isohexaldehyde, n-octaldehyde, 2-ethylhexaldehyde, n-decaldehyde, tridecaldehyde or stearaldehyde, benzaldehyde.

As specific examples of the ketone, there may be mentioned acetone, methylethyl ketone, diethyl ketone, methylisobutyl ketone, di-n-butyl ketone, di-n-octyl ketone, ethylhexyl ketone, benzophenone, cyclobutanone, cyclohexanone or cyclodecanone.

As specified examples of the alcohol, there may be mentioned methanol, ethanol, n-propanol, isopropanol, n-butanol, sec-butanol, 2-ethylbutanol, n-heptanol, n-octanol, 2-ethylhexanol, n-decanol, stearyl alcohol, cyclohexanol, benzyl alcohol, phenol, or cresol.

These nucleophilic reagents may be used alone or as a mixture of two or more different kinds for the reaction with the intermediate reaction product (A).

The reaction to obtain the reaction product (B) useful for the present invention is carried out by dropwise adding the nucleophilic reagent to the intermediate reaction product (A) under stirring. The reaction proceeds at room temperature with heat generation. After completion of the dropwise addition, the reaction is preferably continued at a temperature of from 20° to 150° C., especially from 30° to 100° C., for from 0.5 to 10 hours, especially from 1 to 5 hours, to complete the reaction. This reaction may also be carried out in a diluted state of preliminarily adding an optional inert hydrocarbon solvent to the intermediate reaction product (A).

The amount of the nucelophilic reagent used to obtain the reaction product (B) is preferably not more than 1.0 mol per mol of the Si—H group in the intermediate reaction product (A) and at least 0.5 mol per mol of magnesium in the intermediate reaction product (A). If the amount of the nucleophilic reagent is less than 0.5 mol per mol of magnesium if the intermediate reaction product (A), the removal of the ether compound will be inadequate and the reaction product tends to be viscous, whereby it becomes difficult to perform the operation for the removal of the ether. On the other hand, if the amount is greater than 1.0 mol per mol of the Si—H group in the intermediate reaction product (A), the catalytic activity tends to be decreased or the solubility of the reaction product (B) in the hydrocarbon tends to be lowered.

The reaction of the intermediate reaction product (A) with the alcohol is accompanied by the generation of hydrogen gas. Whereas, when an aldehyde or ketone is reacted thereto, no gas will be generated.

From the measurement of the infrared absorption spectrum of the Si—H bonds in the intermediate reaction product (A) and the reaction product (B) by infrared absorption spectrum method at 2100 cm$^{-1}$, it has been confirmed that the majority of Si—H bonds are disappeared in the reaction product (B). From this, the reaction of the intermediate reaction product (A) with the aldehyde, ketone or alcohol, as represented by the above mentioned formula (1), is assumed to proceed in the following manner:

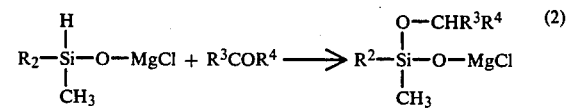

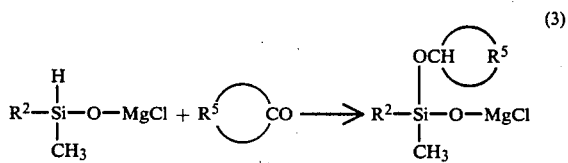

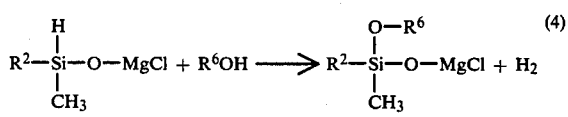

These reactions are similar to the reaction of the hydrosilane compound with a ketone or an aldehyde conducted by Nagai et al (Bull. Chem. Soc. Jpn 45, 3506 (1972)) or the reaction of the hydrosilane compound with an alcohol conducted by Price et al (J. Am. Chem. Soc. 69, 2600 (1947)). In these prior art references, rhodium or a basic compound is used as a catalyst. Whereas the present invention has a feature that these reactions proceed under relatively mild conditions without using any special catalyst. The reaction of the Si—H groups of the magnesium-containing compound with the nucleophilic reagent has never been known before.

As a process for obtaining the reaction product (B) dissolved or suspended in an inert hydrocarbon by removing the ether compound from the reaction mixture of the intermediate reaction product (A) and the nucleophilic reagent, it is preferred to add to the reaction mixture an inert hydrocarbon having a boiling point higher than the ether compound and to subject the mixture to distillation under the atmospheric pressure or reduced pressure to distil off the ether compound. In a case where the reaction product (B) is soluble in the inert hydrocarbon, it is also possible to directly remove the ether compound from the reaction mixture and then dissolve the reaction product in the inert hydrocarbon.

The temperature for distilling off the ether compound is preferably not higher than 150° C., especially not higher than 100° C. If the temperature exceeds 150° C., an insoluble substance is likely to form from the soluble reaction product (B), such being undesirable.

The amount of the ether compound remaining in the reaction product (B) is influential over the catalytic activity, and the smaller the amount, the better. Usually, it is preferred that the amount is not more than 0.4 mol, especially not more than 0.2 mol, per gram atom of magnesium in the reaction product (B).

The solubility of the reaction product (B) in the inert hydrocarbon varies depending not only on the temperature but also on the type of the inert hydrocarbon, the type of the nucleophilic reagent, the hydrocarbon group of the Grignard reagent, and the type and the residual amount of the ether compound. With respect to the type of the inert hydrocarbon, the reaction product (B) is most soluble in an aromatic hydrocarbon such as benzene, toluene or xylene and then in an alicyclic hydrocarbon such as cyclohexane or methyl cyclohexane, and least soluble in an aliphatic hydrocarbon such as n-hexane, n-heptane or n-decane. However, the reaction product (B) obtainable with use of an aldehyde, ketone or alcohol having at least 8 carbon atoms, is soluble in the aliphatic hydrocarbon at room temperature.

In the case of an aldehyde, ketone or alcohol having less than 8 carbon atoms, the reaction product (B) is obtainable in a non-soluble or partially soluble state as suspended in the aliphatic hydrocarbon at room temperature.

To accomplish the object of the present invention, the reaction product (B) must be used in a form dissolved or suspended in the aliphatic hydrocarbon or alicyclic hydrocarbon.

Among the transition metal compounds to be used in the present invention, titanium compounds are represented by the general formula $Ti(OR^7)_m X_{4-n}$ where $R^7$ is a $C_1$-$C_{12}$ hydrocarbon group, X is a halogen atom and $0 \leq n \leq 4$. For instance, there may be mentioned $TiCl_4$, $TiBr_4$, $Ti(OC_2H_5)Cl_3$, $Ti(OC_2H_5)_2Cl_2$, $ti(OC_2H_5)_3Cl$, $Ti(OC_2H_5)_4$, $Ti(On\text{—}C_3H_7)_4$, $Ti(Oiso\text{—}C_3H_7)Cl_3$, $Ti(Oiso\text{—}C_3H_7)_2Cl_2$, $Ti(Oiso\text{—}C_3H_7)_3Cl$, $Ti(Oiso\text{—}C_3H_7)_4$, $Ti(On\text{—}C_4H_9)Cl_3$, $Ti(On\text{—}C_4H_9)_2Cl_2$, $Ti(On\text{—}C_4H_9)_3Cl$, $Ti(On\text{—}C_4H_9)_4$, $Ti(On\text{—}C_6H_{13})Cl_3$, $Ti(On\text{—}C_6H_{13})_4$, $Ti(On\text{—}C_8H_{17})_4$, or $Ti(OC_6H_5)Cl_3$. Further, a condensation product such as $n\text{—}C_4H_9O[Ti(On\text{—}C_4H_9)_2O]_4 n\text{—}C_4H_9$ may also be used.

Trivalent titanium compounds represented by the general formula $Ti(OR^8)_l X_{3-l}$ where $R^8$ is a $C_1$-$C_{12}$ hydrocarbon group and l is a number satisfying $0 \leq l \leq 3$, such as $TiCl_3$ (any one of $\alpha$, $\beta$, $\gamma$ and $\delta$ crystal forms is useful), $Ti(Oiso\text{—}C_3H_7)Cl_2$, $Ti(OC_2H_5)_2Cl$, $Ti(OCH_3)_3$ or $Ti(OC_2G_5)_3$, may also be used. Further, complexes of these trivalent titanium compounds coordinated with a nucleophilic reagent such as an aldehyde, a ketone or an alcohol, may also be used. The amount of the nucleophilic reagent in the complex is preferably not more than 6 mol per mol of the trivalent titanium compound.

As the vanadium compounds among the transition metal compounds, there may be mentioned compounds represented by the general formula $VO(OR^9)_r X_{3-r}$ where $R^9$ is a $C_1$-$C_{12}$ hydrocarbon group, X is a halogen atom and r is a number satisfying $0 \leq r \leq 3$, such as $VOCl_3$, $VO(On\text{—}C_4H_9)_3$, $VO(OnC_{10}H_{21})_2Cl$, $VO(OC_2H_5)_3$ and $VX_4$ wherein X is halogen.

The organoaluminum compounds to be used in the present invention are compounds represented by the general formula $AlR_m^{10}(OR^{11})_s X_{3-m-s}$ where each of $R^{10}$ and $R^{11}$ is a $C_1$-$C_{12}$ hydrocarbon group, X is a hydrogen atom or a halogen atom and $0 < m \leq 3$ and $0 < s < 3$ provided $0 < (s+m) \leq 3$. As specific examples, there may be mentioned trimethylaluminum, triethylaluminum, tributylaluminum, trihexylaluminum, trioctylaluminum, diethylaluminum hydride, dibutylaluminum hydride, diethylaluminum chloride, ethylaluminum sesquichloride, ethylaluminum dichloride, butylaluminum dichloride, diethylaluminum ethoxide and diethylaluminum butoxide.

The final form of the catalyst system of the present invention is obtainable by bringing the reaction product (B) (component (I)), the transition metal compound (component (II)) and at least one organoaluminum compound (component III)) in contact with one another. The components may be brought in contact with one another in various manners as described below.

As a first method, the simplest manner comprises diluting the respective components (I), (II) and (III) with an optional hydrocarbon, and separately introducing them into the polymerization reactor to bring them in contact with one another in the reactor.

As a second method, the components (I) and (II) are preliminarily mixed and reacted, and then introduced into the polymerization reactor, and separately the component (III) is introduced into the reactor so that the three components are brought in contact with one another in the reactor.

As a third method, the components (I) and (II) and one kind or a part of the component (III) are preliminarily mixed and reacted and then introduced into the polymerization reactor, and the other kind or the rest of the component (III) is separately introduced into the reactor so that the predetermined amounts of the respective components are brought in contact with one another in the reactor. Particularly, the preliminary step in the third method may be carried out, for instance, (i) by reacting the components (I) and (II) and then reacting them with one kind or a part of the component (III), followed by the introduction into the polymerization reactor;

(ii) by reacting the component (I) with one kind or a part of the component (III) and then reacting them with the component (II), followed by the introduction into the polymerization reactor; or (iii) by reacting the components (I) and (II) and one kind or a part of the component (III) simultaneously and introducing them into the polymerization reactor. In each case, the subsequent step is carried out in the same manner as mentioned above.

In the second and third methods, the following reaction conditions are commonly applicable. Namely, in the reaction of the components (I) and (II) or in the reaction of the components (I) and (II) and one kind or a part of the component (III), the reaction temperature is from 0° to 100° C., preferably from 20° to 80° C. and the reaction time is from one minute to 5 hours, preferably from 30 minutes to 2 hours. The ratio of the components (I), (II) and (III) is such that the component (II) is from 0.005 to 1.0 mol, preferably from 0.01 to 0.5 mol, and one kind or a part of the component (II) is from 0.1 to 3 mol, per mol of magnesium of the component (I) in the reaction product (B).

The total amount of the organoaluminum compound i.e. the component (III) supplied to the polymerization reactor is from 0.1 to 10 mmol, preferably from 0.2 to 2 mmol, per liter of the solvent. The ratio of the organoaluminum compound to the titanium compound and/or the vanadium compound as represented by the molar ratio of Al/(Ti+V) is from 5 to 2000, preferably from 10 to 500.

When the polymerization of ethylene is carried out with use of the catalyst system of the present invention, the catalyst is usually dispersed in an aliphatic hydrocarbon such as hexane, heptane or kerosene, or an alicyclic hydrocarbon such as cyclohexane or methylcyclohexane, as the solvent, and ethylene is introduced thereto. Further, ethylene may be polyemrized in the presence of not more than 300 molar %, based on ethylene, of an α-olefin such as propylene, butene-1, hexene-1, 4-methylpentene-1, octene-1 or decene-1 to obtain a copolymer having a density of as low as 0.910. The polymerization temperature is usually from 30° to 300° C. However, in order to obtain a copolymer having a narrow molecular weight distribution and a density of from 0.910 to 0.945, it is preferred to carry out the polymerization by a solution polymerization at a temperature of from 140° to 300° C. The polymerization pressure is usually from the atmospheric pressure to 250 kg/cm$^2$. However, it is possible to carry out the polymerization under a high pressure of from 250 to 3500 kg/cm$^2$. The polymerization time is from 1 minute to 7 hours, and it is possible to shorten the polymerization time by raising the polymerization pressure.

The molecular weight of the polymer may be controlled by adjusting the polymerization temperature or by introducing hydrogen to the polymerization system.

Further, it is possible to prepare a polymer having a wide molecular weight distribution by a so-called multistage polymerization in which the polymerization is carried out by means of a combination of a plurality of reaction zones having different polymerization temperatures and hydrogen concentrations.

Now, the present invention will be described in further detail with reference to Examples. For the melt index and the molecular weight distribution, the following methods for measurement were employed.

MI$_2$: Melt index (ASTM-D-1238-65-T, 190° C., Load: 2.16 kg)

Mw/Mn: (Weight average molecular weight/number average molecular weight)
This indicates the degree of the molecular weight distribution as obtained by Gel permeation chromatography (GPC).

EXAMPLE 1

(a) Preparation of the intermediate reaction product (A)

Into a glass reactor preliminarily thoroughly dried internally and flushed with nitrogen, 44 ml of a tetrahydrofuran solution of n-butyl magnesium chloride (which contained 0.1 mol of n-butyl magnesium) was introduced, and while stirring the solution, 6 ml of methylhydropolysiloxane with its terminals sealed with trimethyl silyl groups (the viscosity: about 30 centistokes at 25° C.) (which contained 0.1 mol of Si)was dropwise added at room temperature in one hour. After the dropwise addition, the mixture was aged at 70° C. for one hour to otain a dark brown transparent intermediate product (A). The infrared absorption spectrum of the intermediate product (A) was measured, whereby the ratio of the absorption peak of the Si—H bond at 2100 cm$^{-1}$ to the absorption peak of the Si—CH$_3$ bond at 1250 cm$^{-1}$ (Si—H 2100 cm$^{-1}$/Si—CH$_3$ 1250 cm$^{-1}$) was 1.13.

(b) Preparation of the reaction product (B)

Into a tetrahydrofuran solution of the intermediate reaction product (A) obtained in (a), 0.1 mol of 2-ethylhexaaldehyde was dropwise added in one hour at room temperature under stirring. During the dropwise addition, the solution was cooled with a cooling medium to dissipate the heat generated. After completion of the dropwise addition, the reaction was continued at 50° C. for one hour, and 35 ml of heptane was added to bring the magnesium concentration to be about 1 mol/l. Then, distillation under reduced pressure was carried out at a temperature of from 50° to 60° C. under pressure of from 120 to 240 mmHg to distil off 60 ml. Then, n-heptane was added, and the distillation under reduced pressure was further repeated twice, whereupon a colourless transparent n-heptane solution of a reaction product (B) was obtained. The magnesium concentration was 0.97 mol/l and 0.163 mol of tetrahydrofuran per mol of magnesium remained. (The tetrahydrofuran was quantitatively measured by gas chromatography after subjecting the reaction product (B) to hydrolysis.) The infrared absorption spectrum of the reaction product (B) was measured, whereupon it was found that the peak ratio (Si—H 2100 cm$^{-1}$/Si—CH$_3$ 1250 cm$^{-1}$) was 0.038 and the majority of Si—H groups were reacted with 2-ethylhexaldehyde.

(c) Preparation of the catalyst system

Into a glass reactor preliminarily dried internally and flushed with nitrogen, 50 ml of n-heptane and the reaction product (E) obtained in (b) in an amount of 3.5 mmol as represented by magnesium, were introduced. Then, 7.0 mmol of ethylaluminum dichloride diluted with n-heptane to a concentration of 1.0 mol/l, was added and the mixture was reacted at 70° C. for one hour to obtain a white slurry. To this white slurry, 0.175 mmol of Ti(On—C$_4$H$_9$)$_4$ diluted with n-heptane to a concentration of 0.2 mol/l, was added and the mixture was reacted at 70° C. for one hour.

(d) Polymerization of ethylene

Into a 1.6 l stainless steel autoclave dried internally and flushed with ethylene, 600 ml of n-heptane was fed, then hydrogen was introduced under 0.3 kg/cm$^2$ (absolute pressure), and the mixture was heated to 200° C. Then, the catalyst obtained in (c) in an amount of 0.35 mg as titanium and 0.3 mmol of triisobutyl aluminum were sequentially added, and ethylene was continuously supplied so that the total pressure became 35 kg/cm$^2$ (gauge pressure). The polymerization was carried out for 30 minutes while maintaining the polymerization temperature at 200° C. After cooling, the formed polymer was directly separated and dried, whereupon 52.7 g of polyethylene was obtained, which corresponded to a catalytic activity of 151 kgPE/gTi. MI$_2$ was 1.95, the density was 0.9578 and Mw/Mn was 3.8.

EXAMPLE 2

(a) Preparation of the reaction product (B)

The preparation of the reaction product (B) was performed under the same conditions as in Example 1-(b) except that instead of 2-ethylhexaldehyde, 0.1 mmol of ethylhexylketone was used, whereby a yellowish transparent n-heptane solution having a magnesium concentration of 0.885 mol/l was obtained.

The peak ratio (Si—H 2100 cm$^{-1}$/Si—CH$_2$ 1250 cm$^{-1}$) of the infrared absorption spectrum was 0.061, which indicates that the majority of Si—H groups were reacted with ethylhexylketone. The amount of the remaining tetrahydrofuran was 0.168 mol per mol of magnesium.

(b) Polymerization of ethylene

The preparation of the catalyst and the polymerization of ethylene were preformed under the same conditions as in Example 1-(c) and 1-(d) except that the reaction product (B) obtained in the above (a) was used, whereupon 31.8 g of polyethylene was obtained. The catalytic activity was 91 kgPE/gTi, MI$_2$ was 1.14, the density was 0.9558 and Mw/Mn was 4.0.

EXAMPLE 3

(a) Preparation of the reaction product (B)

The preparation of the reaction product (B) was performed under the same conditions as in Example 1-(b) except that instead of 2-ethylhexaldehyde, 0.1 mol of 2-ethylhexanol was used and prior to carrying out the distillation under reduced pressure, ageing was conducted at room temperature for 2 hours until no more generation of hydrogen gas was observed, whereby a colourless transparent n-heptane solution having a magnesium concentration of 1.07 mol/l was obtained. The amount of the remaining tetrahydrofuran was 0.015 mol per mol of magnesium. The peak ratio (Si—H 2100 cm$^{-1}$Si—CH$_3$ 1250 cm$^{-1}$) was 0.418.

(b) Polymerization of ethylene

The preparation of the catalyst and the polymerization of ethylene were performed under the same conditions as in Example 1-(c) and 1-(d) except that the reaction product (B) obtained in the above (a) was used, whereupon 51.1 of polyethylene was obtained.

The catalytic activity was 146 kgPE/gTi, MI$_2$ was 4.14, the density was 0.9584 and Mw/Mn was 3.6.

COMPARATIVE EXAMPLE 1

(a) Removal of tetrahydrofuran from the intermediate reaction product (A)

To an intermediate reaction product (A) obtained under the same conditions as in Example 1-(a), 100 ml of n-heptane was added, and the mixture was subjected to distillation under reduced pressure at a temperature of from 50° to 60° C. to distil off tetrahydrofuran (THF). The tetrahydrofuran solution of the reaction product (A) was immiscible with n-heptane, and separated as a lower layer. As the tetrahydrofuran was removed, the intermediate reaction product (A) became viscous and adhered to the reactor wall, and it solidified without being dispersed in n-heptane, whereb it was impossible to obtain a uniform suspension.

COMPARATIVE EXAMPLE 2

(a) Removal of tetrahydrofuran from the intermediate reaction product (A)

To an intermediate reaction product (A) obtained under the same conditions as in Example 1-(a), 50 ml of toluene was added, and the magnesium concentration was adjusted to about 1 mol/l. Then, the mixture was subjected to distillation under reduced pressure at a temperature of from 50° to 60° C. under pressure of from 120 to 240 mmHg to distil off 60 ml. The addition of toluene and the distillation under reduced pressure were further repeated twice, whereupon a dark brown transparent solution was obtained.

The magnesium concentration was 1.10 mol/l, and the amount of the remaining tetrahydrofuran was 0.45 mol per mol of magnesium.

(b) Polymerization of ethylene

The preparation of the catalyst and the polymerization of ethylene were performed under the same conditions as in Example 1-(c) and 1-(d) except that the toluene solution of the above intermediate reaction product (A) was used, whereupon 4.5 g of polyethylene was obtained. The catalytic activity was 13 kgPE/gTi, which was considerably lower than the catalytic activity obtained by the present invention.

COMPARATIVE EXAMPLE 3

(a) Preparation of a solid catalyst component

Into a glass reactor dried and flushed with nitrogen, the intermediate reaction product (A) obtained in Comparative Example 2-(a), in an amount of 0.1 mmol as magnesium, and 100 ml of toluene were introduced and heated to 70° C. Then, 0.2 mmol of TiCl$_4$ was dropwise added under stirring, and reacted at 70° C. for 2 hours. After the reaction, the solid component thereby obtained was washed with 300 ml of n-heptane 6 times by decantation and filtration. The titanium content in 1 g of the solid catalyst component thereby obtained was 110 mg.

(b) Polymerization of ethylene

The polymerization of ethylene was carried out under the same conditions as in Example 1-(d) except that the solid catalyst component obtained in the above (a) was used in an amount of 0.40 mg as titanium, whereupon 8.3 g of polyethylene was obtained. The catalytic activity was 21 kgPE/gTi, which was considerably lower than the catalytic activity obtained by the present invention.

EXAMPLE 4

(a) Preparation of the intermediate reaction product (A)

The reaction was performed in the same manner as in Example 1-(a) except that instead of the tetrahydrofuran solution of n-butyl magnesium chloride, 45 ml (0.1 mol as magnesium) of a diethyl ether solution of n-butyl magnesium chloride was used and the ageing after the addition of methylhydropolysiloxane was carried out at 36° C. for one hour, whereby a white suspension of an intermediate reaction product (A) was obtained.

(b) Preparation of the reaction product (B)

To the above mentioned intermediate product (A), 50 ml of n-heptane was added and then 0.078 mol of 2-ethylhexaldehyde was dropwise added at room temperature in one hour. During the dropwise addition, heat was generated, the white suspension gradually disappeared, and after the dropwise addition a colourless transparent solution was obtained. The solution was subjected to distillation at an internal temperature of from 36° to 60° C. under the atmospheric or reduced pressure to distil off 35 ml whereby diethyl ether was removed.

After an addition of n-heptane, a colourless transparent solution of a reaction product (B) having a magnesium concentration of 0.831 mol/l was obtained.

The amount of the remaining diethyl ether was 0.092 mol per mol of magnesium. The peak ratio (Si—H 2100 cm$^{-1}$/Si—CH$_3$ 1250 cm$^{-1}$) of the infrared absorption spectrum was 0.172. No absorption peaks at 1690 cm$^{-1}$ and 1747 cm$^{-1}$ for the C=O bonds of 2-ethylhexaaldehyde were detected.

(c) Polymerization of ethylene

The preparation of the catalyst and the polymerization of ethylene were performed under the same conditions as in Example 1-(c) and 1-(d), whereupon 74.2 g of polyethylene was obtained.

The catalytic activity was 212 kgPE/gTi, MI$_2$ was 3.93 and the density was 0.9596.

EXAMPLE 5

(a) Polymerization of ethylene

The polymerization of ethylene was performed under the same conditions as in Example 4 except that the polymerization temperature was 170° C. and hydrogen was supplied under 0.6 kg/cm$^2$ (absolute pressure), whereupon 144.5 g of polyethylene was obtained.

The catalytic activity was 413 kgPE/gTi, MI$_2$ was 1.47 and the density was 0.9575.

EXAMPLE 6

(a) Preparation of the reaction product (B)

The operation was performed in the same manner as in Example 4-(b) except that instead of 2-ethylhexaldehyde, 0.1 mol of ethanol was used and the amount of the distillate at the time of the distillation of the ether was 61 ml, whereby a white suspension of a reaction product (B) having a magnesium concentration of 0.798 mol/l was obtained. The amount of the remaining diethyl ether was 0.04 mol per mol of magnesium.

(b) Polymerization of ethylene

The preparation of the catalyst and the polymerization of ethylene were performed under the same conditions as in Example 1-(c) and 1-(d), whereupon 54.7 g of polyethylene was obtained.

The catalytic activity was 156 kgPE/gTi, and MI$_2$ was 3.78.

COMPARATIVE EXAMPLE 4

(a) Removal of diethyl ether from the intermediate reaction product (A)

The removal of diethyl ether was performed in accordance with Example 4-(b) without reacting 2-ethylhexaldehyde, whereby a viscous suspension of an intermediate reaction product (A) was obtained. The magnesium concentration was 0.876 mol/l, and the amount of the remaining ether was 0.643 mol per mol of magnesium.

(b) Polymerization of ethylene

The preparation of the catalyst and the polymerization of ethylene were performed under the same conditions as in Example 1-(c) and 1-(d), whereupon 9.0 g of polyethylene was obtained.

The catalytic activity was 26 kgPE/gTi, which was considerably lower than the catalytic activity obtained by the present invention.

EXAMPLE 7

(a) Preparation of the catalyst

Into a glass reactor preliminarily dried internally and flushed with nitrogen, 50 ml of n-heptane and the reaction product (B) obtained by Example 3-(a) in an amount of 3.5 mmol as magnesium were introduced. Then, 0.175 mmol of Ti(On—C$_4$H$_9$)$_4$ was added and reacted at 70° C. for one hour, whereby no change on appearance was observed on the colourless transparent solution.

(b) Polymerization of ethylene

Into a 1.6 l stainless steel autoclave dried internally and flushed with ethylene, 600 ml of n-heptane was fed, then hydrogen was introduced under 0.6 kg/cm$^2$ (absolute pressure) and the temperature was raised to 170° C. Then, the catalyst component obtained in the above (a) in an amount of 0.35 mg as titanium and 0.5 mmol of diethylaluminum chloride were sequentially added, and ethylene was continuously supplied so that the total pressure became 35 kg/cm$^2$ (gauge pressure). The polymerization was carried out for 30 minutes while maintaining the polymerization temperature at 170° C. After cooling, the formed polymer is directly separated and dried. The results thereby obtained are shown in Table 1.

EXAMPLE 8

(a) Polymerization of ethylene

The polymerization of ethylene was performed under the same conditions as in Example 7-(b) except that without carrying out the preparation of the catalyst as mentioned in Example 7-(a), the reaction product (B) obtained by Example 3-(a) in an amount of 0.146 mmol as magnesium, 0.5 mmol of diethylaluminum chloride and 0.0073 mmol (0.35 mg as titanium) of Ti(O-n—C$_4$H$_9$)$_4$, were sequentially added to the autoclave after heated to 170° C.

The results thereby obtained are shown in Table 1.

EXAMPLE 9

(a) Polymerization of ethylene

The preparation of the catalyst and the polymerization of ethylene were performed under the same conditions as in Example 7-(a) and 7-(b) except that the reaction product (B) obtained by Example 4-(b) was used and Ti(On—C$_4$H$_9$)$_4$ was used in an amount of 0.105 mmol.

The results thereby obtained are shown in Table 1.

EXAMPLE 10

(a) Polymerization of ethylene

The preparation of the catalyst and the polyemrization of ethylene were performed under the same conditions as in Example 7-(a) and 7-(b) except that the reaction product (B) obtained by Example 4-(b) was used and instead of Ti(On—C$_4$H$_9$)$_4$, TiCl$_4$ was used.

The results thereby obtained are shown in Table 1.

TABLE 1

| Examples | Yields | Catalytic activities kgPE/gTi | MI$_2$ | Densities g/cm$^3$ | Mw/Mn |
|---|---|---|---|---|---|
| 7 | 103.5 | 296 | 1.34 | 0.9576 | 2.6 |
| 8 | 102.2 | 292 | 0.88 | 0.9573 | 3.0 |
| 9 | 124.0 | 353 | 1.68 | 0.9577 | 2.9 |

TABLE 1-continued

| Examples | Yields | Catalytic activities kgPE/gTi | MI$_2$ | Densities g/cm$^3$ | Mw/Mn |
|---|---|---|---|---|---|
| 10 | 109.9 | 314 | 1.50 | 0.9573 | 3.1 |

EXAMPLES 11-16

(a) Preparation of the reaction product (B)

The preparation of the reaction product (B) was carried out under the same conditions as in Example 1-(a) and 1-(b) except that the type of the Grignard reagent, the type and amount of the nucleophilic reagent and the number of times of the distillation under reduced pressure for the removal of tetrahydrofuran were varied.

(b) Polymerization of ethylene

The preparation of the catalyst and the polymerization of ethylene were performed under the same conditions as in Example 7-(a) and 7-(b).

TABLE 2

| Examples | 11 | 12 | 13 |
|---|---|---|---|
| Preparation of the reaction product (B) | | | |
| Grignard reagents | Methyl-magnesium chloride | n-Octyl-magnesium chloride | Phenylmagnesium chloride |
| Nucleophilic reagents | | | |
| Kind | 2-Ethyl-hexanol | 2-Ethyl-hexanol | 2-Ethylhexanol |
| Amount used*$^1$ | 1.0 | 1.0 | 0.64 |
| Number of times of distillation*$^2$ | 2 | 2 | 2 |
| Remaining THF*$^3$ | 0.113 | 0.050 | 0.204 |
| Polymerization results | | | |
| Yields | 89.3 | 99.7 | 81.7 |
| Catalytic activities kgPE/gTi | 255 | 288 | 233 |
| MI$_2$ | 1.13 | 1.37 | 0.99 |

TABLE 2'

| Examples | 14 | 15 | 16 |
|---|---|---|---|
| Preparation of the reaction product (B) | | | |
| Grignard reagents | n-Butyl-magnesium chloride | n-Butyl-magnesium chloride | n-Butylmagnesium chloride |
| Nucleophilic reagents | | | |
| Kind | 2-Methyl-butyr-aldehyde | Isobutanol | n-Decanol |
| Amount used*$^1$ | 1.0 | 1.0 | 0.86 |
| Number of times of distillation*$^2$ | 3 | 3 | 1 |
| Remaining THF*$^3$ | 0.127 | 0.076 | 0.376 |
| Polymerization results | | | |
| Yields | 60.9 | 69.4 | 54.3 |
| Catalytic activities kgPE/gTi | 174 | 198 | 155 |
| MI$_2$ | 1.41 | 1.10 | 0.93 |

*$^1$Mols per mol of Si—H groups in the intermediate reaction product (A).
*$^2$Number of times for removal of ether by the addition of n-heptane and the distillation under reduced pressure.
*$^3$Mols of the remaining tetrahydrofuran per mol of magnesium in the reaction product (B).

EXAMPLE 17

(a) Preparation of the catalyst

The preparation of the catalyst was performed under the same conditions as in Example 7-(a) except that 1.19 mmol of triethylaluminum was added prior to the addition of Ti(On—C$_4$H$_9$)$_4$ and reacted at 70° C. for one hour, whereupon a brown transparent solution was obtained.

(b) Polymerization of ethylene

The polymerization was performed under the same conditions as in Example 7-(b) except that the polymerization temperature was 200° C. and the supply of hydrogen was 0.3 kg/cm$^2$ (absolute pressure), whereupon 46.3 g of polyethylene was obtained.

The catalytic activity was 132 kgPE/gTi, and MI$_2$ was 2.92.

EXAMPLES 18 TO 21

(a) Preparation of the catalyst

The preparation of the catalyst was performed under the same conditions as in Example 1-(c) except that the reactin product (B) obtained by Example 3-(a) was used, 3.5 mmol of ethylaluminum dichloride was used, and the type of the transition metal compound was varied.

(b) Polymerization of ethylene

The polymerization of ethylene was performed under the same conditions as in Example 7-(b).

The results thereby obtained are shown in Table 3.

TABLE 3

| Examples | Transition metal compounds | Yields | Catalytic activities kgPE/g (Ti + V) | MI$_2$ |
|---|---|---|---|---|
| 18 | Ti(On-C$_4$H$_9$)$_4$ | 109.5 | 313 | 1.26 |
| 19 | TiCl$_4$ | 85.0 | 243 | 1.00 |
| 20 | Ti(On-C$_4$H$_9$)Cl$_3$ | 88.6 | 253 | 0.93 |
| 21 | TiCl$_4$/VOCl$_3$*$^1$ | 69.5 | 193 | 0.73 |

*$^1$A mixture having a molar ratio of 1/1. The (Ti + V) amount used for the polymerization was 0.36 mg.

EXAMPLE 22

(a) Preparation of the catalyst

Into a glass reactor preliminarily dried and flushed with nitrogen, 50 ml of n-heptane and 5 mmol of γ-TiCl$_3$ were introduced, and 20 mmol of isopropanol was dropwise added at room temperature, and reacted at 60° C. for one hour, whereby a blue TiCl$_3$-isopropanol complex slurry was obtained.

The preparation of catalyst was performed under the same conditions as in Example 7-(a) except that instead of Ti(On—C$_4$H$_9$)$_4$, the above TiCl$_3$-isopropanol complex was used in an amount of 0.175 mmol as titanium, whereby a brown transparent solution was obtained.

(b) Polymerization of ethylene

The polymerization of ethylene was performed under the same conditions as in Example 7-(b), whereupon 122.6 g of polyethylene was obtained.

The catalytic activity was 350 kgPE/gTi and MI$_2$ was 1.24.

EXAMPLE 23

(a) Polymerization of ethylene

The copolymerization of ethylene with octene-1 was performed under the same conditions as in Example 1-(d) except that the catalyst component obtained by Example 3 was used in an amount of 0.53 as titanium, 80 g of octene-1 was added, and the supply of hydrogen was 0.1 kg/cm² (absolute pressure), whereupon 119.8 g of polyethylene was obtained.

The catalytic activity was 226 kg/gTi, MI₂ was 3.70 and the density was 0.9212.

EXAMPLE 24

(a) Polymerization of ethylene

The copolymerization of ethylene with butene-1 was performed under the same conditions as in Example 7-(b) except that 20 g of butene-1 was used and the supply of hydrogen was 0.1 kg/cm² (absolute pressure), whereupon 83.0 g of polyethylene was obtained.

The catalytic activity was 237 kgPE/gTi. MI₂ was 3.40 and the density was 0.9228.

EXAMPLE 25

(a) Preparation of the catalyst

The preparation of the catalyst was performed under the same conditions as in Example 1-(c) except that the reaction product (B) obtained by Example 3-(a) was used and Ti(On—C₄H₉)₄ was used in an amount of 0.35 mmol.

(b) Polymerization of ethylene

Into a 1.6 l stainless steel autoclave dried internally and flushed with ethylene, 600 ml of n-hexane and 0.5 mmol of triethylaluminum was fed and the temperature was raised to 55° C. Then, the catalyst prepared in the above (a) was added in an amount of 0.5 mg as titanium and hydrogen was introduced under 2.5 kg/cm² (absolute pressure). After raising the temperature to 75° C., ethylene was supplied to bring the total pressure to a constant level of 8 kg/cm² (gauge pressure), and the polymerization was conducted for one hour while maintaining the polymerization temperature at 75° C. The yield of the polyethylene thereby obtained was 194.3 g. The catalytic activity was 389 kgPE/gTi. MI₂ was 1.30.

We claim:

1. A process for producing polyethylene, which comprises:
    polymerizing ethylene or copolymerizing ethylene with another α-olefin in the presence of a catalyst system obtained by bringing the following components (I) to (III) in contact with each other:
    (1) a reaction product (B) obtained by reacting an intermediate reaction product (A) obtained by reaction of a hydropolysiloxane with a Grignard reagent which is synthesized in the presence of an ether compound, with at least one nucleophilic reagent selected from the group consisting of an aldehyde, a ketone and an alcohol and then removing the ether such that the amount of remaining ether is not more than 0.4 mol per gram atom of magnesium,
    (2) a transition metal compound which is a titanium compound of the formula: (i) Ti(OR⁷)ₙX₄₋ₙ, wherein R⁷ is a C₁-C₁₂ hydrocarbon group, X is halogen and 0≦n≦4 or the formula: (ii) Ti(OR⁸)ₗX₃₋ₗ, wherein R⁸ is a C₁-C₁₂ hydrocarbon group, X is halogen and 0≦l≦3, or a complex (iii) of a compound of the formula (ii) with a nucleophilic agent, or (iv) a vanadium compound of the formula: VO(OR⁹)ᵣX₃₋ᵣ, wherein R⁹ is a C₁-C₁₂ hydrocarbon group, X is halogen and 0≦r≦3 or (v) a compound of the formula: VX₄ wherein X is halogen, and
    (3) at least one organoaluminum compound.

2. The process according to claim 1 wherein the hydropolysiloxane is a chain or cyclic compound having a structural unit represented by the general formula

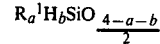

where R¹ is a C₁-C₁₂ hydrocarbon group, an alkoxy group or a phenoxy group, a is 0, 1 or 2 and b is 1, 2 or 3 provided a+b≦3.

3. The process according to claim 1 wherein the Grignard reagent is an ether solution or an ether complex compound of an organic magnesium compound represented by the general formula (MgR²₂)ₚ·(MgR²X)_q where R² is a C₁-C₁₂ hydrocarbon group, X is a halogen atom and each of p and q is a number of from 0 to 1 provided p+q=1.

4. The process according to claim 1 wherein the nucleophilic reagent is an aldehyde or ketone represented by the general formula R³COR⁴ where R³ and R⁴ may be the same or different and each represents a hydrogen atom or a C₁-C₁₄ hydrocarbon group or the general formula

where R⁵ is a C₃-C₁₇ divalent hydrocarbon group, or an alcohol represented by the general formula R⁶OH where R⁶ is a C₁-C₁₈ hydrocarbon group.

5. The process according to claim 1 wherein the organoaluminum compound is a compound represented by the general formula AlR_m¹⁰(OR¹¹)ₛX₃₋ₘ₋ₛ where each of R¹⁰ and R¹¹ is a C₁-C₁₂ hydrocarbon group, X is a hydrogen atom or a halogen atom and 0<m≦3, 0≦s<3 and 0<(s+m)≦3.

6. The process according to claim 1, 2 or 3 wherein in the reaction of the hydropolysiloxane with the Grignard reagent, the molar ratio of MgR²:Si is within a range of from 1:1 to 1:5.

7. The process according to claim 1, 2, 3 or 4 wherein in the preparation of the reaction product (B) from the intermediate product (A) and the nucleophilic reagent, the amount of the nucleophilic reagent is not more than 1.0 mol per mol of the Si—H group in the intermediate reaction product (A) and at least 0.5 mol per mol of Mg in the intermediate reaction product.

8. The process according to claim 1 wherein the catalyst system is formed by separately introducing the components (I), (II) and (III) into the polymerization system so that they are brought in contact with each other in the polymerization reactor.

9. The process according to claim 1 wherein the catalyst system is formed by preliminarily mixing and reacting the components (I) and (II), then introducing them into the polymerization system and separately introducing the component (III) into the polymerization system.

10. The process according to claim 1 wherein the catalyst system is formed by preliminarily mixing and reacting components (I) and (II) and a portion of the predetermined amount of an organoaluminum compound (III) required to react with said components (I) and (II), then introducing the components into the polymerization system and separately introducing the remainder of said organoaluminum compound (III) necessary to react with said components (I) and (II) into the polymerization system.

11. The process according to claim 1, 8, 9 or 10 wherein the molar ratio of the components (I), (II) and (III) in the polymerization reactor is such that the component (II) is from 0.01 to 0.5 mol per mol of magnesium in the component (I), and the Al/(Ti+V) molar ratio of the components (II) and (III) is from 10 to 500.

12. The process according to claim 1 wherein said α-olefin to be copolymerized with ethylene is one or more selected from the group consisting of propylene, butene-1, hexene-1, 4-methylpentene-1, octene-1 and decene-1.

13. The process according to claim 1 wherein the polymerization or copolymerization is carried out in a solvent of an aliphatic hydrocarbon or alicyclic hydrocarbon at a temperature within a range of from 30° to 300° C. under a pressure within a range of from the atmospheric pressure to 250 kg/cm$^2$.

14. The process according to claim 1, wherein the catalyst system is formed by preliminarily mixing and reacting components (I) and (II) and a portion of the predetermined amount of said organoaluminum component (III) which is a single organoaluminum compound, then introducing the components into the polymerization system and separately introducing the remainder of said organoaluminum component (III) necessary to react with components (I) and (II) which is a different organoaluminum compound.

* * * * *